United States Patent [19]
Brown

[11] 3,770,419
[45] Nov. 6, 1973

[54] PYROLYSIS PROCESS SYSTEM FOR RECYCLING OF REFUSE

[75] Inventor: Harry D. Brown, Grand Junction, Colo.

[73] Assignee: Ebert E. Lewis, Grand Junction, Colo. ; a part interest

[22] Filed: July 19, 1971

[21] Appl. No.: 163,736

[52] U.S. Cl. ......................... 75/63, 75/44 S, 201/11
[51] Int. Cl. .............................................. C22b 7/00
[58] Field of Search ...................... 201/11; 202/219; 110/8 E; 266/37; 75/44 S

[56] References Cited
UNITED STATES PATENTS

| | | | |
|---|---|---|---|
| 1,658,143 | 2/1928 | Tripp | 201/11 |
| 2,699,933 | 1/1955 | Siefert, Sr. | 266/37 |
| 3,558,304 | 1/1971 | McIntyre | 75/63 |
| 3,668,120 | 6/1972 | Patterson | 210/71 X |

FOREIGN PATENTS OR APPLICATIONS 565,761  11/1958  Canada ................................... 75/63

Primary Examiner—L. Dewayne Rutledge
Assistant Examiner—M. J. Andrews
Attorney—Duane Burton

[57] ABSTRACT

A novel pyrolysis process system for recycling of refuse wherein refuse is fed into a closed retort. The closed retort includes a moving molten lead bath for accomplishing the pyrolysis of the refuse. The pyrolysis process converts the organic portions of the refuse to a vapor state to facilitate ultimate recovery of tars, oils and other petroleum-related products, a part of which includes fuel that may be utilized to operate the system. The non-organic portions of the refuse are ultimately separated into high grade char, ferrous metals, non-ferrous metals and precious metals. The pyrolysis process exhausts no gases into the atmosphere and allows virtually all components of the refuse to be recycled into usable products.

8 Claims, 5 Drawing Figures

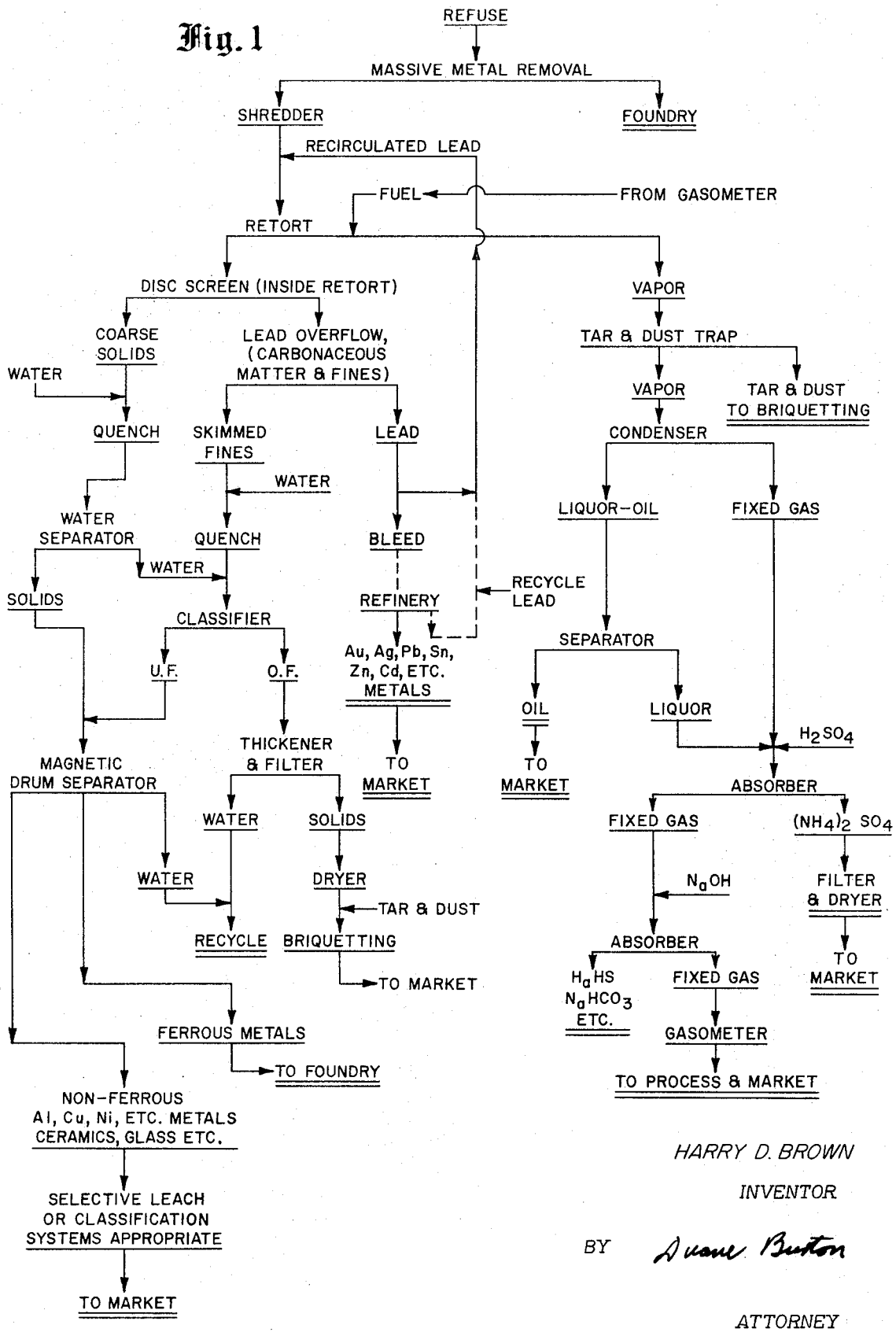

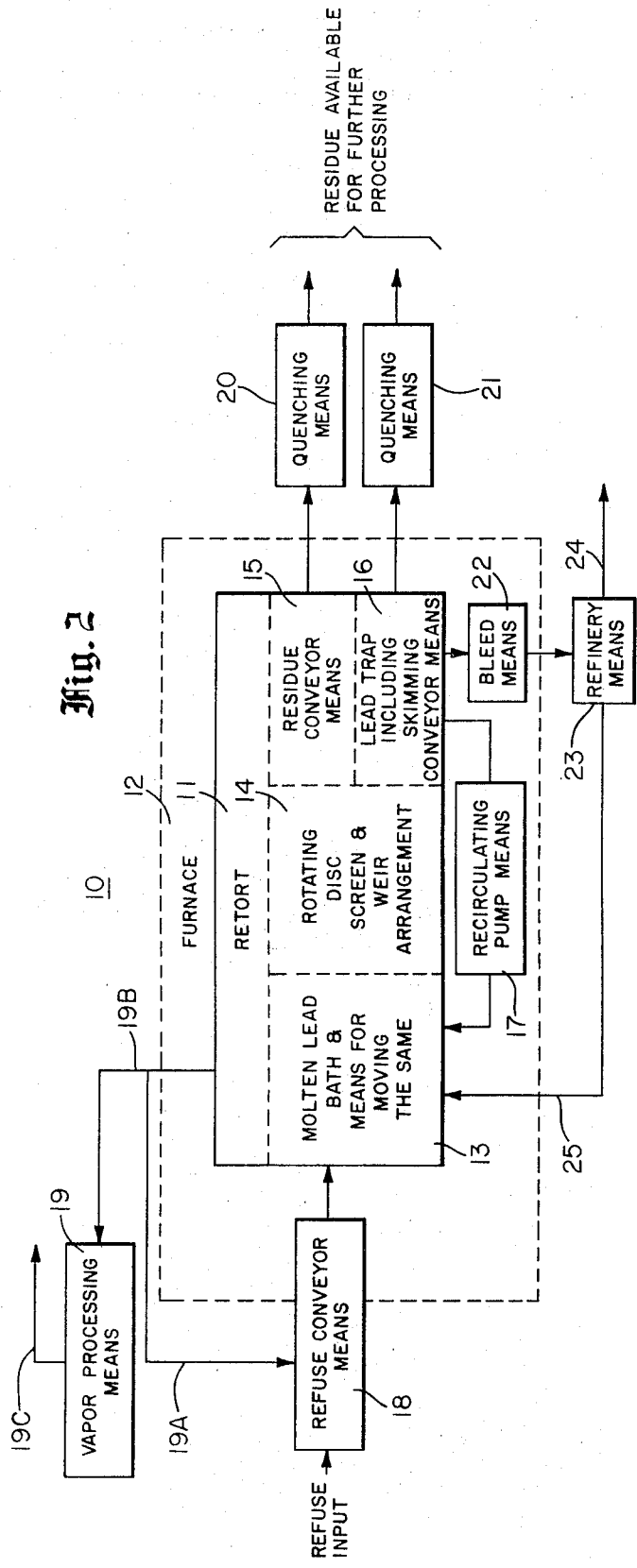
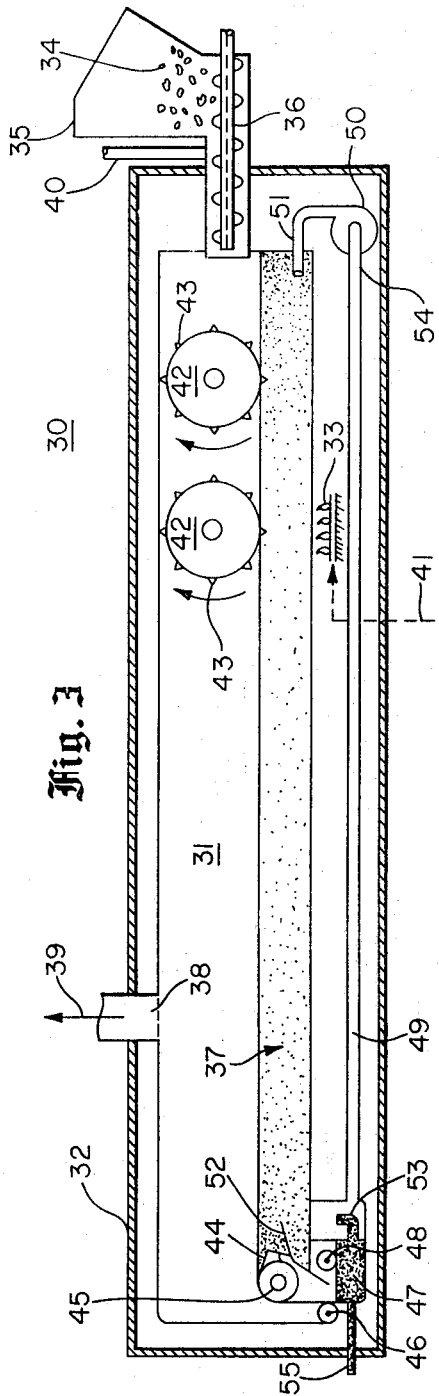

HARRY D. BROWN
INVENTOR

BY Duane Burton
ATTORNEY

PYROLYSIS PROCESS SYSTEM FOR RECYCLING OF REFUSE

FIELD OF THE INVENTION

This invention relates to a pyrolysis process system for the recycling of refuse and more particularly to a novel pyrolysis process system wherein refuse is fed into a closed retort which includes a moving molten lead bath and means for providing vapor, fluid and solid outputs that may be ultimately converted into usable products.

DESCRIPTION OF THE PRIOR ART

Many systems for disposing of refuse have been employed in the past and many more so recently since man has realized that he must not pollute his environment. Refuse has been partially burned and the unburned residue was buried or deposited in the rivers or the oceans. The smoke from the burning refuse polluted the air and the residue polluted the land, rivers and oceans. Furthermore, man has learned that the earth is being depleted of natural materials that he has taken for granted for years. Thus, man realized that he must recycle refuse to recover the valuable materails that had been wastefully thrown away in the past. Recycling systems have been utilized to recover certain specific valuable materials from refuse; however, due to either rising costs or hurried engineering efforts, these systems have proved to be either too expensive or inadequate.

Accordingly, it is an object of the present invention to provide a novel pyrolysis process system for the recycling of refuse wherein refuse is processed efficiently and inexpensively.

It is a still further object of the present invention to provide a novel pyrolysis process for the treatment of sewage plant sludge wherein sludge is fed into a closed retort and converted to volatile gases by the pyrolytic action, the volatile gases are not vented to the atmosphere, but are converted to useable gases and products.

It is another object of the present invention to provide a novel pyrolysis process system for the recycling of refuse wherein the organic portions of the refuse are converted into fuel for operating the system.

It is yet another object of the present invention to provide a novel pyrolysis process system for recycling refuse wherein the volatile gases produced by the pyrolytic action are not vented to the atmosphere.

SUMMARY OF THE INVENTION

In accordance with the objects set forth above, the present invention provides a novel pyrolysis process system for the recycling of refuse wherein refuse is fed into a closed retort. The closed retort includes a moving molten lead bath for accomplishing the pyrolysis of the refuse. The closed retort provides vapor, fluid and solid outputs. The pyrolysis process converts the organic portions of the refuse to a vapor state to facilitate ultimate recovery of tars, oils and other petroleum-related products, a part of which includes fuel that may be utilized to operate the system. The non-organic portions of the refuse are ultimately separated into high grade char, ferrous metals, non-ferrous metals, and precious metals. The fluid output is lead which is refined to recover various metals. The refined lead is then recirculated to the molten lead bath.

BRIEF DESCRIPTION OF THE DRAWINGS

Additional objects, advantages and characteristic features of the present invention will become readily apparent from the following detailed description of the preferred embodiments of the invention when taken in conjunction with the accompanying drawings in which:

FIG. 1 is a flow chart of the pyrolysis process system for the recycling of refuse to provide usable products in accordance with the present invention;

FIG. 2 is a functional block diagram of a pyrolysis process system for the recycling of refuse in accordance with the present invention;

FIG. 3 is an elevational view of a pyrolysis process system for the recycling of refuse, including a closed retort, shown partially sectioned, in accordance with the present invention;

DESCRIPTION OF THE PREFERRED EMBODIMENTS

Figure 4:
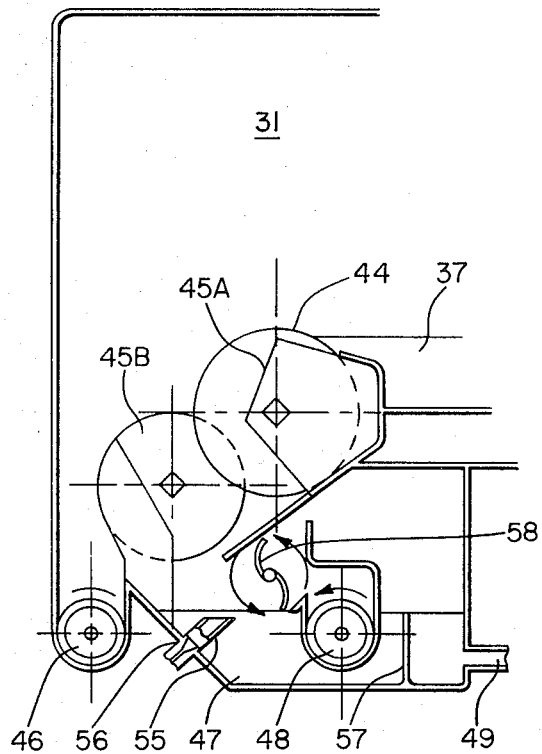
FIG. 4 is an enlarged elevational view of a disc screen and weir arrangement located within the closed retort in accordance with the present invention.

Referring now to FIG. 1, there is shown a flow chart of a pyrolysis process system for recycling of refuse into usable products in accordance with the principles of this invention. Refuse of all types may be transported to the pyrolysis process system for recycling. The refuse may be first visually surveyed so that massive metallic pieces, such as automobile engines, large castings, etc., may be removed and sent directly to a foundry for processing. Such initial classification allows one to utilize a conventional shredder to reduce the smaller pieces of refuse, such as metal cans, plastic and glass containers, and papers, to various sizes of approximately two to three inches which can be easily accommodated in the feeder and screw conveyor described later in this specification.

A closed retort is utilized in order to prevent pollution of the atmosphere. The shredded refuse is conveyed to the closed retort by means of a screw conveyor. The screw conveyor compacts the shredded refuse and thus provides a seal to virtually eliminate the entry of air into the closed retort in order to prevent oxidation of the molten lead within the closed retort. In addition, gas manufactured within the closed retort during the pyrolysis process is fed into the screw conveyor to form a gas seal to further ensure that air does not enter the closed retort.

The main purpose of the flow chart of FIG. 1 is to illustrate the products which can be recovered by the pyrolysis process of the present invention. Therefore, the discussion of FIG. 1 will be limited to the outputs of the closed retort and the general means for providing such outputs. The closed retort includes a moving molten lead bath. While other molten metal baths, such as a molten zinc bath, may be utilized, the molten lead bath has the advantage of having a higher specific gravity.

Depending upon the yields of various materials desired, the molten lead bath may be heated to any temperature between a minimum of 350°C and a maximum of 620°C. For example, at higher bath temperatures, greater gas yields could be anticipated; however, such higher temperatures would increase the decomposition of the valuable oils. The gas yield provided at more moderate temperatures within the above range is more than enough to support the heating of the closed retort.

The outputs of the closed retort may be generally classified as fluid, solids and vapor. Within the closed retort, paper, plastic and other organic materials that decompose at 620°C or less are converted to gases. The gases or vapors which are formed by the decomposition of such organic materials are withdrawn from the retort and refined by conventional means. A tar and dust trap is utilized to separate the tar and dust which may be later combined with refined carbonaceous matter to produce char briquettes, as shown in the flow chart. The vapor is treated with conventional condensers and gas absorbers to recover $(NH_4)_2SO_4$, oils, a liquor, and fixed gas. The recovered products are marketed and a portion of the fixed gas is utilized in the process, the balance of such gas being marketed. In the pyrolysis process of the present invention, it is estimated that approximately 5.5 million BTU's of fuel will be recovered per ton of refuse. The heating of the furnace for the closed retor will require approximately 3 million BTU's of fuel, thus, a sizeable surplus of fuel may be marketed.

The fluid output of the closed retort will be of molten lead and combined metals. Bleed means are utilized to transfer part of the fluid out of the closed retort. The bleed means is located in a lead sump within the closed retort. A valve is utilized to vary the bleed output since the amount of combined metals, e.g., tin, zinc, gold, silver, etc., is not uniform in every load of refuse. The valve may be controlled automatically be means of constant spectroscopic examination of the bleed output. The bleed output is directed to refinery means to separate the combined metals from the lead. Since the low melting point metals within the bleed output tend to oxidize more readily than lead, the refinery means includes a drossing operation to accomplish oxidation of the lower melting point metals. The refined lead is then returned to the closed retort.

The rest of the illustrated fluid output comprises the majority of fluid output which is the molten lead that is constantly recirculated to moving molten lead bath within the closed retort. Such molten lead is recirculated by means of a bank of tubes and recirculating pump means located under the closed retort.

The third output of the closed retort is comprised of solids. The majority of these solids would be high grade char, glass, ceramics, iron, aluminum, copper and other metals with melting points above 620°C that have not been dissolved in the molten lead bath. As will be taught later in the specification, one of the embodiments of the present invention includes means for separating solids within the closed retort to provide at least two outputs of solids, namely, coarse solids and carbonaceous fines; however for the purpose of discussing the recovery of usable solid products, the immediate discussion of such is applicable to any output of solids from the closed retort.

The output solids, or residue, are transferred from the closed retort by means of a screw conveyor that provides an upward discharge of the residue to quenching means which cool the residue before it is exposed to air. The upward discharge of the screw conveyor provides a seal to ensure that no air enters the closed retort. The quenching process is mandatory because the residue includes char, which is a high grade carbon that is very finely divided and highly explosive.

After the quenching operation, the residue is subjected to a magnetic drum separator to separate the ferrous metal from the non-ferrous material. The ferrous metal may be marketed directly to a foundry. The carbonaceous matter and fines may be subjected to a classifying, thickening and filtering process and then dried. As discussed earlier, tar and dust separated from the vapor output of the retort may be combined with the refined carbonaceous matter to produce char briquettes.

Referring now to FIG. 2, there is shown a functional block diagram of a pyrolysis process system 10 in accordance with the principles of this invention. Whereas the pyrolysis process system of FIG. 1 was primarily concerned with illustrating the complete recycling of all components of the refuse to usable products, the pyrolysis system 10 of FIG. 2 primarily deals with the means to initially recover and separate components of the refuse for later classification and refinement. The pyrolysis process system 10 is generally comprised of a closed retort 11, which is located within a furnace 12, and various means for providing refuse input to the closed retort 11 and vapor, solid and liquid outputs from the closed retort 11. It should be understood that the term refuse as used throughout this application includes sewage plant sludge, garbage, and other discarded matter.

The closed retort 11 is generally comprised of five major components, which are shown separated by the dashed lines, namely, a molten lead bath and means for moving the same 13, a rotating disc screen and weir arrangement 14, residue conveyor means 15, a lead trap including skimming conveyor means 16, and recirculating pump means 17. The furnace 12 provides the necessary heat to the closed retort 11 to accomplish pyrolysis of the refuse fed to pyrolysis process system 10.

The refuse to be processed within the retort 11 may be deposited in the refuse conveyor means 18 in any suitable manner, for example, via a dump truck or conveyor means. The refuse conveyor means 18 is shown partially located within the block representing the furnace 12 because one of the embodiments of the present invention includes preheating of the refuse by means of heat generated within the furnace 12 prior to feeding it into the retort 11. Before the refuse is fed into the furnace 12, it may be preheated for the first time by hot vapors supplied from the retort 14 via line 19A. As mentioned earlier in the discussion of FIG. 1, a screw conveyor is utilized to feed refuse to a closed retort, the screw conveyor being utilized to virtually eliminate the entry of air into the closed retort 11. Such a screw conveyor may be one of the components of the refuse conveyor means 18, and the output 19A of the closed retort 11 provides a gas seal to further ensure that air does not enter the closed retort 11. The vapor processing means 19 may receive retort-generated hot vapors via line 19B. The output line 19C represents surplus vapor which is not utilized as a gas seal in the screw conveyor. Such surplus vapor may be stored and marketed or may be utilized as fuel for the pyrolysis process system 10. Thus, the refuse may be preheated twice prior to its entrance into the closed retort 11 in order that the pyrolytic process may occur more quickly to provide a more efficient pyrolysis of the refuse. Upon entering one end of the retort 11, the refuse is submerged into the moving molten lead bath. The means for moving the molten lead bath may be partially submerged rotating drums having suitable means, such as paddles, which also serve the function of forcing the refuse beneath the surface of the molten lead bath to ensure maximum volatilization of the organics and intimate contact of the inorganics for stripping of the previous metals and low melting point metals. At the other end of the retort 11, there is located the rotating disc screen and weir arrangement 14. The primary purpose of the rotating disc screen and weir arrangement 14 is to screen and convey from the molten lead bath carbonized residue, high melting-point metals, etc. The high melting-point metals and carbonized residue will pass over the disc screen and will drop to the residue conveyor means 15 for ultimate transfer out of the retort 11. The lead and the low melting-point metals and also carbonized residue will pass through the rotating disc screen to the lead trap. The carbonized residue will be transferred out of the retort 11 via the skimming conveyor means 16. The respective outputs of residue conveyor means and the skimming conveyor means are transferred out of the retort 11 to respective quenching means 20 and 21. The respective outputs of residue from the quenching means 20 and 21 are then available for further processing as described in the discussion of FIG. 1.

Bleed means 22 are provided to remove a portion of the molten lead and the combined metals within the lead trap 16. The output of the bleed means 22 is refined in the refinery means 23 to separate the low melting-point metals, e.g., zinc, tin, etc., and precious metals, e.g., gold, silver, etc., from the molten lead. The line 24 represents the recovered low melting-point metals and the precious metals, while the line 25 represents lead that is recycled to the molten lead bath 13.

Referring now to FIG. 3, there is shown an elevational view of a pyrolysis system 30 for the recycling of refuse in accordance with principles of the present invention. The components of the pyrolysis process system 30 are partially sectioned in order to facilitate discussion of the system and the steps involved in the processing of the refuse. As discussed earlier, a closed retort having a moving molten lead bath is the major component of the pyrolysis process system of the present invention.

A closed retort 31 is shown with a furnace 32. The retort 31 may be conventionally mounted within the furnace 32. The flames 33 represent heating of the retort 31 to accomplish pyrolysis of the refuse. As discussed earlier, the operator may select any temperature between a minimum of 350°C and a maximum of 620°C.

Refuse 34 may be placed in an input feeder box 35 shown on the right side of the furnace 32. An input screw type conveyor 36 compacts the refuse 34 to provide a seal to virtually eliminate the entry of air into the closed retort 31. Prior to feeding the refuse 34 into the retort 31, it may be preheated twice. The refuse 34 may be first preheated by hot gas that has been recovered from the retort 31 via vent means 38. The arrow designated 39 represents the vapors resulting from the pyrolytic processing of the organic matter in the refuse 34. As discussed earlier, this vapor output may be refined to provide tars, oils and petroleum-related products. Another part of the refined output is fuel, a part of which may be used to operate the system 30 as illustrated by the arrow designated 41, the surplus of which may be marketed. A portion of the hot gas from 39 may then be fed into the input screw-type conveyor 36 via input line 40 to provide a gas seal to further ensure that no air enters the closed retort 31. The refuse 34 is then preheated within the furnace 32 as it travels to the closed retort 31.

As the refuse 34 enters the retort 31, it is forced into the moving molten lead bath 37 by a series of partially submerged drums 42 having paddles 43. While only two such drums 42 are shown, it should be understood that a number of similar drums may be employed along the surface of molten lead bath 37 depending upon its length. The drums 42 serve three principal functions, namely, to submerge the refuse so as to provide initimate contact between the refuse and the molten lead, to ensure flow of the refuse and molten lead through the retort, and to dislodge "sweat" from the residue, e.g., beads of molten zinc from galvanized sheet or tin cans, etc.

When the processed refuse 34 or residue reaches the other end of the molten lead bath 37, it encounters a set of weir knives 44 which direct the residue to a rotating disc screen 45. The combination of the set of weir knives and the disc screen 45 conveys and screens high melting-point metals, etc., from the surface of the molten lead bath 37. The high melting point metals, glass, etc., will pass over the disc screen 45 and will drop to the residue conveyor means 46 for ultimate transfer out of the closed retort 31. The lead and the low melting-point metals and char will pass through the rotating disc screen 45 to a lead trap or sump 47. Char and any residue which passes through the disc screen 45 will be transferred out of the retort 31 via skimming conveyor means 48. Part of the lead and liquified matter will be transferred out of the closed retort 31 via bleed means 55.

The conveyors 46 and 48 are of the screw type that was discussed relative to FIG. 2, i.e., they provide an upward discharge of the residue to separate quenching means which cool the residue prior to its exposure to the atmosphere. The upward discharge of the conveyors 46 and 48 provides a seal for the retort 31 to ensure that hot gases do not escape the retort 31 to pollute the atmosphere. The specific construction and operation of the conveyors 46 and 48 will be discussed in detail in the discussion of FIG. 4.

The molten lead within the lead trap 47 will flow into a bank of tubes designated 49, and will be recycled back into the molten lead bath 37 by means of a conventional pump 50 via a tube 51. The bank of tubes designated by the numeral 49 originates at the overflow 53 of the lead trap 47 and terminates in a manifold 54 which discharges to the pump 50. Upon entering the molten lead bath 37, the return molten lead is discharged to a point near the feed end of the retort 31 to aid in the flow of the molten lead bath 37.

Referring now to FIG. 4, there is shown an enlarged elevational view of a disc screen and weir arrangement located within the closed retort 31 in accordance with the principles of this invention. A pair of rotating disc screens 45A and 45B are utilized in series to provide a larger area and a longer path over which the high melting-point metals and carbonized residue must travel. Thus, such an arrangement ensures that a substantial part of the lead and the droplets of low melting-point metals adhering to the high melting-point metals and the carbonized residue will drop into the lead trap 47. The rotating disc screen 45B is located at a lower elevation than the rotating disc screen 45A to ensure that a substantial part of the lead and the droplets of low melting-point metals adhering to the upper surface of high melting-point metals and the carbonized residue will drop into the lead trap 47.

The lead trap 47 includes the skimming conveyor means 48 and also skimming means 58 which rotates in the direction of the illustrated arrow to skim the surface of the lead in the lead trap 47 to direct any residue that has passed through the rotating disc screens 45A and 45B to the skimming means 48 for ultimate discharge out of the retort 31. A member 57 may be employed to control overflow of the lead trap 47.

The bleed means 55 of FIG. 4 are similar to the bleed means previously discussed; however, a bleed valve 56 is illustrated to show that the bleed output may be utilized to vary such output. As discussed earlier, the bleed valve may be controlled automatically by means of constant spectroscopic examination of the bleed output.

Figure 5:
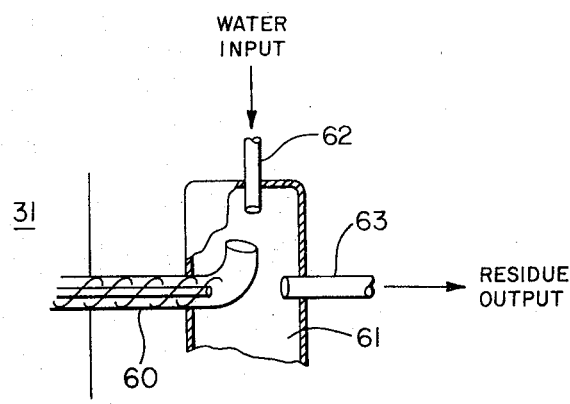
FIG. 5 is an enlarged elevational view of residue conveyors of the pyrolysis process system, shown partially sectioned, in accordance with the present invention.

Referring now to FIG. 5, there is shown an enlarged elevational view of residue conveyors of the pyrolysis process system, shown partially sectioned, in accordance with the present invention. The screw-type conveyor means 60 is identical to the residue conveyor means 46 and the skimming conveyor means 48 illustrated earlier. The present view is illustrated to particularly point out the upward discharge of residue and the like out of the closed retort 31. As discussed earlier, such upward discharge of the output of retort 31 to the quenching means 61 provides a closed pyrolysis process that ensures that the pyrolysis process system 30 does not pollute the atmosphere. Water is upplied to the quenching means 61 via the input pipe 62. The output pipe 63 allows the cooled residue to be transferred out of the quenching means 61 for further processing into usable products.

Thus, although the present invention has been shown and described with reference to particular embodiments, for example, a closed retort having a molten lead bath, nevertheless, various changes and modifications obvious to one skilled in the art to which this invention pertains, for example, a closed retort having a molten zinc bath, are deemed to lie within the spirit, scope and contemplation of the invention as set forth in the appended claims.

What is claimed is:

1. A pyrolysis process for recycling refuse of organic and non-organic materials including metals comprising the steps of:

feeding the refuse into a closed retort having a molten metal bath;

submerging said refuse in said molten metal bath to subject said refuse to a pyrolytic reaction to obtain vapors, a solid residue including a char, non-organic residue and unmelted metals, and molten metals;

collecting vapors resulting from the volatization of the organic materials within said refuse and transferring said vapors from said closed retort;

screening said molten metal bath to substantially separate the majority of said solid residue resulting from said pyrolytic reaction from the molten metal of said bath and other molten metals;

conveying the screened solid residue out of said closed retort; separating any remaining solid residue from the other molten metals and a portion of said molten metal bath by skimming;

conveying the skimmed other molten metals and a portion of said molten metal of said bath out of said closed retort; and conveying the skimmed remaining portion out of said closed retort.

2. A pyrolysis process for recycling refuse as recited in claim 1 wherein said molten metal bath is a molten lead bath at a temperature between 350°C and 620°C.

3. A pyrolysis process for recycling refuse as recited in claim 1 wherein said refuse is compacted and fed into said closed retort by means of a screw conveyor to ensure that virtually no air enters the closed retort.

4. A pyrolysis process for recycling refuse as recited in claim 3 wherein a gas flow is supplied to an intermediate portion of said screw conveyor to further ensure that virtually no air enters said closed retort.

5. A pyrolysis process for recycling refuse as recited in claim 4 wherein said gas flow is at a higher temperature than said refuse.

6. A pyrolysis process for recycling refuse as recited in claim 1 which includes the step of preheating the refuse by means of the heat employed to heat the molten metal bath.

7. A pyrolysis process for recycling refuse as recited in Claim 1 wherein said solid residue is conveyed out of said closed retort by means of a screw-type conveyor having a discharge end at a higher elevation than its input end.

8. A pyrolysis process for recycling refuse as recited in claim 1 which includes the step of recirculating the majority of said molten metal of said bath into said closed retort.

* * * * *

UNITED STATES PATENT OFFICE
CERTIFICATE OF CORRECTION

Patent No. 3,770,419          Dated November 6, 1973

Inventor(s) Harry D. Brown

It is certified that error appears in the above-identified patent and that said Letters Patent are hereby corrected as shown below:

Assignee

In the Assignee, "Ebert" should read--Elbert --.

Column 1, line 36, after "process" insert -- system --.

Column 3, line 22, omit "retor" and substitute therefor --retort-

Column 3, line 33, "be". 2nd occ. should read--by--.

Column 5, line 38 after "pyrolysis" insert -- process --.

Column 6, line 18, after "dislodge" insert -- metallic --.

Signed and sealed this 23rd day of July 1974.

(SEAL)
Attest:

McCOY M. GIBSON, JR.              C. MARSHALL DANN
Attesting Officer                 Commissioner of Patents